United States Patent [19]

Carron et al.

[11] Patent Number: 5,468,395
[45] Date of Patent: Nov. 21, 1995

[54] PROCESS AND APPARATUS FOR DEMINERALIZING WATER

[75] Inventors: Didier Carron, Saint-Maur-des-Fosses; Philippe Deblay, Chatenay-Malabry; Robert Desage, Verneuil-sur-Seine, all of France

[73] Assignee: C.O.G.I.A. Societe Anonyme, Orsay, France

[21] Appl. No.: 21,845

[22] Filed: Feb. 24, 1993

[30] Foreign Application Priority Data

Feb. 24, 1992 [FR] France ................... 92 02107

[51] Int. Cl.⁶ ..................... B01D 35/18; C02F 1/00
[52] U.S. Cl. .............. 210/774; 210/175; 210/184; 210/687; 210/508; 210/509
[58] Field of Search ............... 159/DIG. 27, DIG. 28; 210/687, 774, 184, 175, 177, 508, 509, 510.1

[56] References Cited

U.S. PATENT DOCUMENTS

| | | | |
|---|---|---|---|
| 3,240,683 | 3/1966 | Rodgers | 159/DIG. 28 |
| 3,340,186 | 9/1967 | Weyl | 203/11 |
| 3,505,175 | 4/1970 | Zalles | 159/DIG. 28 |
| 3,805,959 | 4/1974 | Mertens | 210/295 |
| 4,153,556 | 5/1979 | Riedinger | 210/218 |
| 4,387,026 | 6/1983 | Woolacott | 210/677 |
| 4,620,900 | 11/1986 | Kimura et al. | 202/172 |
| 4,801,386 | 1/1989 | Sugimori et al. | 210/680 |
| 4,844,796 | 7/1989 | Plester | 210/100 |
| 5,028,298 | 7/1991 | Baba et al. | 202/161 |

FOREIGN PATENT DOCUMENTS

| | | |
|---|---|---|
| 0088315 | 9/1983 | European Pat. Off. . |
| 0171357 | 2/1986 | European Pat. Off. . |
| 0312079 | 4/1989 | European Pat. Off. . |
| 0363253 | 5/1928 | Germany . |
| 2030501 | 2/1987 | Japan ............ 159/DIG. 28 |
| 62-14069 | 6/1987 | Japan . |
| 2126997 | 5/1990 | Japan . |
| 8907972 | 9/1989 | WIPO ................. 210/774 |

OTHER PUBLICATIONS

CA 72:35660.
CA 85:130157.
"Memento technique de l'eau'", Ninth Edition 1989, p. 485, Editions Degremont.
Database WPIL, Week 9025, Derwent Publications Ltd., London, GB, AN 90190641.
Patent Abstract of Japan, vol. 113, No. 69 (c–461).
French Search Report and Annex.

*Primary Examiner*—Virginia Manoharan
*Attorney, Agent, or Firm*—Sandler, Greenblum & Bernstein

[57] ABSTRACT

Process and apparatus for demineralizing water include a fibrous microporous body having interfiber spaces in communication with one another and a porosity at least equal to 50%, water supply elements for supplying water to be demineralized through the fibrous microporous body, a heating device adapted to heat the fibrous microporous body to a temperature of at least 60° C., and elements adapted to collect the demineralized water.

26 Claims, 2 Drawing Sheets

PROCESS AND APPARATUS FOR DEMINERALIZING WATER

BACKGROUND OF THE INVENTION

1. Field of the Invention

The present invention is related to a device for demineralizing water, especially in order to reduce its hardness.

2. Discussion of Background Information

Water hardness, represented by a water hardness testing level or TH, which is expressed in degrees Fahrenheit (°F.), measures the concentration of various calcium and magnesium salts. We are aware of a comprehensive list of salts that determine water hardness, especially by the publication "Mémento technique de l'eau" Ninth Edition 1989, page 485, Editions Degremont. The main characteristic of these salts is to co-precipitate if the temperature is raised, especially beyond approximately 60° C., and to form deposits, commonly known as tartar. Water treatment, in order to reduce its hardness, often consists of fighting tartar, although other aims can also be undertaken, such as for example demineralizing water for laboratory applications.

A variety of devices for the partial or total demineralization of water, especially in order to reduce its hardness, are currently known. Among the most commonly used devices, one can differentiate between those using ion exchange resins, and those that function by precipitation, either by adding a precipitating agent, or by raising temperature.

We are also aware of devices that prevent tartaring, in which a magnetic field is created that stops the formation of precipitates. However, these devices do not enable the reduction of the quantity of minerals contained in the water, and therefore to reduce its hardness.

In devices using ion exchange resins, water is made to pass through a granular resin that retains the salts by an ionic exchange, and water is captured at its exit. These devices are remarkably efficient, although efficiency decreases rapidly as the resin is saturated by salts. Some resins can be regenerated, and this substantially increases their life span. However, the resins/used have some disadvantages. On the one hand, they are expensive and on the other hand, they have a short life span, except in cases of regeneration. However, regeneration is both long and pain-staking.

In devices functioning by precipitation, a precipitating agent is added causing a selective precipitation of salts and then the precipitates formed are eliminated. Relatively simple, and less expensive, these devices however have certain disadvantages. For example, the introduction of a precipitating agent requires obtaining a very precise measurement of the salts to be precipitated, and one runs the risk of either introducing too little agent in order to precipitate the totality of the salts, or, on the contrary, of introducing too much, necessitating the elimination of such excess precipitating agent. Additionally, the precipitating agent does not act on the totality of the salts, and some of these, which influence water hardness, generally remain present in the water after its treatment. Moreover, the removal of the precipitate formed by the precipitating agent requires the implementation of fairly complex devices necessitating frequent maintenance.

In devices functioning by precipitation by raising the temperature of the water to be demineralized, such water is made to pass along a hot surface, which causes, on such surface, a precipitation of numerous salts. Prevention of tartar deposits in industrial boilers is often obtained in this manner.

These devices, that are relatively simple to implement, suffer, however, from the fact that their reliability is uncertain, and their efficiency is fairly limited. Indeed, the precipitates that accumulate on the hot surface form, in general, quasi-impermeable, extremely dense and extremely hard deposits, that rapidly reduce the efficiency of the heat transfer surface of the hot surface. In addition, the homogenous heating of water can only be obtained with difficulty, because the upper layer of the water is not in contact with the hot surface. The result is that either only one portion of the water is demineralized, or that precipitation is spread out spatially, resulting in the creation of overwhelming deposits that are badly located.

Suggestions have been made to improve the efficiency of devices for precipitating salts by heat effect by increasing the area of the hot surface with which the water to be treated comes into contact. Thus, in the patent HULSMEYER DE-C-363 253, the water to be treated is introduced at the upper portion of a closed cylindrical enclosure having a vertical axis and containing a porous material of a truncated shape, which extends along the greater portion of the height of the enclosure, and is constituted of tough or synthetic stone. This material is heated by injection, in the enclosure, of pressurized steam. The water to be treated flows both on the external surface of the porous material, between the chinks separating the different blocks, and through the volume of the porous material itself with a lesser through-put. Such a devices has substantial inconveniences.

First, the quality of the demineralization obtained is not uniform because, as is clear, it depends on the throughput of water brought to the surface of the porous material. In fact, the greater this through-put and the greater the quantity of water that flows outside the porous material, the greater is the proportion of water that does not come into contact (or very little contact) with the porous material.

Second, such a device is especially cumbersome, and this excludes it from being used in various applications and especially, for small utilitarian appliances, such as irons, wallpaper removers, etc.

Generally speaking, demineralizing devices belonging to prior art and using heated porous materials, crossed by the water to be demineralized, have two major disadvantages that manifest themselves and worsen with increased use by a progressive blocking of the pores due to the formation of quasi-impermeable deposits mentioned previously. First, the through-put is substantially limited, and second, reducing the contact surface of the water with the porous material results in a drop in the quality of the demineralization as it is used.

SUMMARY OF THE INVENTION

The object of the present invention is to provide a device for at least a partial demineralization of water, especially in order to reduce its hardness. The device according to the present invention has surprising characteristic of providing demineralized water whose quality not only does not decrease with increasing use, but on the contrary, whose quality-improves with increasing use. Furthermore, the through-put of the demineralized water obtained is not reduced in any noticeable manner, or at least not for a substantial amount of usage time. Additionally, the invention enables a demineralizing device to be obtained which is adequately compact in order to be used in appliances having small capacity, such as for example, irons, or wallpaper removers.

The object of the present invention is therefore to provide a device for demineralizing water of the type comprising a porous material crossed by the water to be demineralized, characterized in that the porous material is constituted by a fibrous microporous body, whose interfiber spaces are in contact with one another, the porosity of the fibrous microporous body being at least equal to 50%, such device comprising means for supplying the water to be demineralized from an upstream surface of the fibrous microporous body so as to enable the percolation of the water to be demineralized exclusively through the fibrous microporous body, from the upstream surface of such body towards a downstream surface, heating means of the fibrous microporous body adapted to maintain such body, at least during the percolation, at a temperature of at least 60° C., so as to cause a rapid rise in the temperature of the water to be demineralized that comes into contact with the fibrous microporous body during percolation, and means adapted to collect the demineralized water after its percolation.

In the present text, the term fibrous microporous body designates any porous body constituted by fibers, intertwined or not, forming between them chinks or pores that are not visible to the naked eye, but which can be detected under an optical microscope. Moreover, the chinks or pores are in contact with one another so as to be permeable to water. The general porosity of the fibrous microporous body, that is, the ratio of the volume occupied by the pores accessible by the water molecules, on the total volume of the porous body is greater than 50%.

In an interesting embodiment of the invention, the maintenance of the fibrous microporous body at a given temperature is ensured by means of steam.

In a variation of the present embodiment of the invention, the steam flow crosses the fibrous microporous body at a counter-current with respect to the direction of percolation of water inside such body. This enables an even easier heat transfer between the steam and the fibrous microporous body, as well as an excellent thermal homogeneity of the latter, improving retention of salts inside the device.

In an interesting embodiment of the invention, heating of the fibrous microporous body is obtained by a steam flow that is injected through the body.

Tests carried out by the Applicant has established that the fact that the water to be demineralized is brought to the surface of a fibrous microporous body, that the fibrous microporous body is heated to a temperature of at least 60° C. and that the water to be demineralized is made to percolate through the body, enables one to obtain an especially efficient retention of the salts contained in the water to be demineralized.

On the one hand, the Applicant has established that reduction of the water hardness level of water is considerably greater when, under identical conditions, the water to be demineralized is brought to the surface of a fibrous and permeable microporous body, and that it percolates thereafter through the body, than if it is brought to the surface of a permeable but non-microporous body. This improvement is attributed by the Applicant to the very fine dispersion of water which occurs at the surface of the fibrous microporous body, specifically, in its superficial layer. Further, as in its volume induces a considerable surface exchange between the micro-droplets of water thus created and the pores of the fibrous microporous body, and provides a greater surface for fixation of the precipitates. Indeed, upon its arrival at the surface of the microporous body, water has the tendency of impregnating the superficial layer of the material, thus creating a real retention space, and especially a precipitation space, instead of a simple surface.

The present invention enables one to overcome one of the major disadvantages of devices obtaining the demineralization of water by passage of such water along a heated body, i.e., the formation on the body of impermeable, hard, and insulating deposits whose presence disturbs the efficient functioning of the demineralizing device and the quality of the demineralized water obtained. Indeed, conversely with respect to deposits obtained in prior art devices, the deposits formed at the surface of a fibrous and permeable microporous body can be powdered, and crumbled. The deposits become porous and permeable, so as to produce a very remarkable phenomenon, that is, retaining the efficiency of percolation of the water to be demineralized during treatment, and even improving it.

Indeed, the fibrous microporous body during a repeated implementation of the invention is progressively covered by a second microporous body, having increasing thickness, composed of deposits formed during usage of the device. The upper surface of such second microporous body thus becomes the seat of formation of deposits whose porosity is added to that of the initial fibrous microporous body.

In addition, as is known by prior art, the deposits already formed constitute a very favorable environment for the constitution of new deposits, the retention of salts at the surface of the microporous body occurring especially by precipitation. This second microporous body is therefore ideally adapted to become the support for new deposits obtained by precipitation. Under these conditions, not only do the deposits formed not constitute a hinderance for the efficient functioning of the demineralizing device, as is admitted by the teachings of prior art, but on the contrary, these deposits improve the quality of the demineralization obtained.

BRIEF DESCRIPTION OF THE DRAWINGS

Described hereinafter, as non-limiting examples only, are embodiments of the present invention, with reference to the annexed drawings in which.

DETAILED DESCRIPTION OF THE PREFERRED EMBODIMENTS

Figure 1:
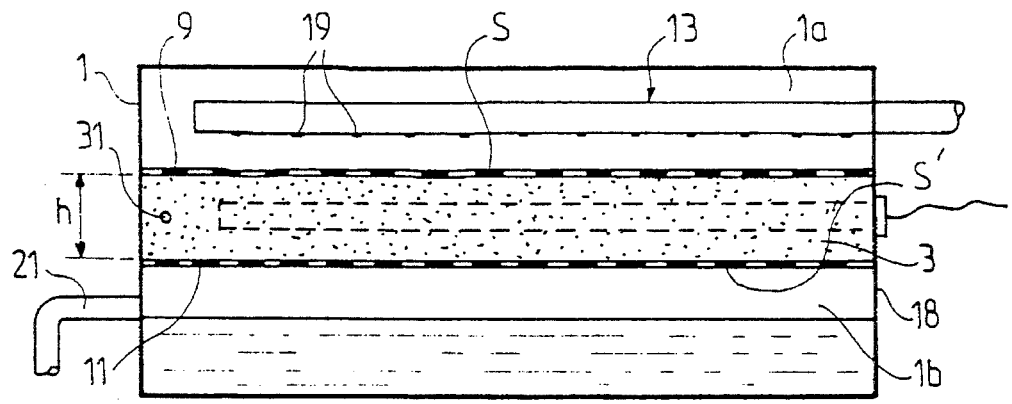
FIG. 1 is a vertical schematic sectional view of a demineralizing device according to the invention.

The results obtained by implementing the device according to the invention for partially demineralizing tap water, which is moderately calcarious, of an initial hardness of TH 24, can be found hereinafter.

The four series of experiments that follow were undertaken by using fibrous and permeable microporous bodies having an upper surface of approximately 50 cm$^2$, a thickness of 2 cm, suspended at mid-height in a closed enclosure approximately 15 cm long, 4 cm wide and 8 cm high, these fibrous microporous bodies being brought, by appropriate heating means, to a temperature of approximately 90° C. These fibrous microporous bodies are irrigated by tap water at a temperature of approximately 15° C., by a ramp, constituted by a cylindrical tube bored with several holes, enabling a good distribution of the water.

In a first series of tests, summarized in Table I, the variation of the water hardness level of water was measured for fibrous microporous bodies of various types, after the water had crossed, according to the invention, a predetermined fibrous microporous body having respectively different thicknesses. The entry through-put of water was approximately 35 cm$^3$/minute, and the yield of the demineralized water, that is the yield of water downstream from the fibrous microporous body was also 35 cm$^3$/minute.

During this test, the fibrous microporous body was constituted by intertwined fibers of five micrometers in diameter successively made of silica mineral wool, calcium silicate, alum silicate, the porosity of each of these porous bodies being approximately 80%.

TABLE I

| | Material Used | Thickness (mm) | General Porosity (%) | Final TH (°F.) |
|---|---|---|---|---|
| PRIOR ART | | | | |
| Surface Flow | Copper | Surface Flow | | 18 |
| | Polypropylene | | | 18 |
| INVENTION | | | | |
| Percolation through a permeable and porous body | Lightened silica | 30 | 75 | 16 |
| | Mineral wool | 20 | 98 | 16 |
| | Calcium silicate | 10 | 80 | 12 |
| | Alum silicate | 5 | 80 | 12 |
| | Alum silicate | 10 | 80 | 12 |
| | Alum silicate | 20 | 80 | 12 |

Table I highlights the advantages of using a fibrous microporous body whose porosity and permeability are sufficient to undertake a demineralization, resulting in an appreciable reduction of hardness. It must be noted that during the tests undertaken with copper and polypropylene, water flowed along the surface of such materials, then fell along their edges, in a manner similar to the treatment devices implemented according to prior art techniques.

It must be noted that the quality of the demineralization obtained varies according to the nature of the fibrous microporous body used. In particular, silicate based materials enable a greater reduction of the water hardness level as compared to other materials.

It should also be noted, as is shown by the last three tests of Table I, that the thickness of the fibrous microporous body does not have any substantial effect on the quality of the result, precipitation and retention of salts taking place at the surface of such body, and in the first millimeters in the vicinity of its upstream surface. However, a thickness of approximately one to two centimeters is desirable in order to obtain good mechanical resistance for the fibrous microporous body. The present invention thus enables a substantial reduction in space requirements and thus also the weight of prior art demineralizing devices and this expands the fields of application of such devices.

Figure 6:
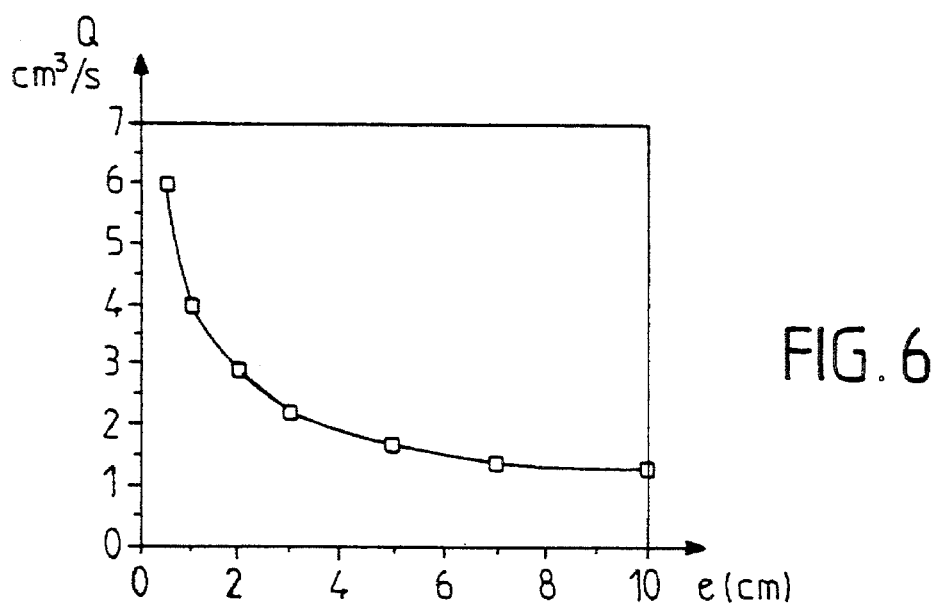
FIG. 6 is a graph representing the variation in the throughput of the water to be demineralized through a microporous body in accordance with the thickness of such body.

The present invention, while enabling the constitution of demineralizing devices having a fibrous microporous body of less thickness, also enables one to obtain greater quantities of demineralized water. Indeed, as is represented in FIG. 6, it can be noted that in the case, for example, where the microporous body is constituted by intertwined fibers of mineral wool of five micrometers in thickness, the porosity of such microporous fibrous body is approximately 98% the water through-put through the body is 6 cm$^3$/second when the fibrous microporous body has a thickness of 0.5 cm, and 1.5 cm$^3$/second when such body has a thickness of 10 cm.

Additional measurements have established that a minimal porosity of 50% is necessary to obtain a good impregnation of the superficial layer of the fibrous microporous body by the water to be demineralized, as well as to ensure good percolation. Very satisfactory results are obtained with a porosity of approximately 70%. The materials used to constitute the fibrous microporous body have, with very few exceptions, excellent permeability. This permeability is necessary in order that the water brought to the surface of the fibrous microporous body can impregnate tits superficial layer and percolate through the body.

In a second series of tests, a fibrous microporous body constituted by a block of alum silicate having a thickness of 2 cm and a porosity of 80% was supplied with water to be demineralized at a temperature of approximately 15° C. whose TH was also equal to approximately 24, and the temperature of the fibrous microporous body was varied. The measurements of the water hardness levels of the demineralized water obtained have been presented in Table II:

TABLE II

| Temperature of the fibrous microporous body (°C.) | Water hardness level of the water obtained (°F.) |
|---|---|
| 50 | 24 |
| 65 | 20 |
| 90 | 12 |
| 98 | 12 |

The results of this second series of tests show that no substantial demineralization occurs unless the microporous body is brought to a temperature of approximately at least 60° C. It must be noted that this temperature is effective during functioning, that is, during irrigation of the surface of the fibrous microporous body by the water to be demineralized.

These tests highlight the difference between devices using ion exchange resins and the device according to the invention because, when cold, the fibrous microporous body used does not retain any of the calcium and magnesium salts contained in the water to be demineralized, either on its surface or in its volume, whereas ion exchange resins retain at least a portion of such salts at room temperature.

In a third series of tests, in which the fibrous microporous body was a block of alum silicate fibers of a thickness of 2 cm, maintained around a temperature of 90° C., the initial temperature of the water to be treated was varied, and Table III hereafter shows the corresponding variations of the water hardness level of the water obtained.

TABLE III

| Initial temperature of the water to be demineralized (°C.) | Water Hardness Level of the Water Obtained (°F.) |
|---|---|
| 15 | 12 |
| 40 | 16 |
| 65 | 20 |

These results show that increasing the difference in temperature between the water to be demineralized and the fibrous microporous body in which it percolates during demineralization, enables a very substantial improvement in the effectiveness of the treatment. It is possible that a quick rise in temperature of the water, or thermal shock, favors a crystallization of salts at the fixation sites at the surface and also in the volume of the fibrous microporous body. Inversely, percolation through the fibrous microporous body of previously heated water only leads to a retention of the previously precipitated salts, this retention. Most likely occurring at the surface.

In a fourth series of tests, in which the fibrous microporous body was a block of calcium silicate fiber of a thickness of 1 cm, the distribution of water brought to the surface of the microporous body was varied the through-put of the water to be demineralized remained constant and equal to 35 cm³/minute, its water hardness level was 24, and the temperature of the fibrous microporous body was maintained at approximately 90° C. The surface of the fibrous microporous body was also inclined in order that the water, which has a tendency to flow along the surface, doubles the impregnation surface. The results obtained have been presented in Table IV hereafter:

TABLE IV

| Number of Water Input Openings | Impregnation Surface cm² | TH Final |
|---|---|---|
| 6 | 6 | 12 |
| 10 | 10 | 11 |
| 10 and inclined surface | 20 | 10 |

The results of this fourth series of tests show that a good distribution of water distributed at the surface of the fibrous microporous body enables improvement in the efficiency of demineralization, probably due to the fact that there is a co-relational increase in contact surface between the water and the fibrous microporous body.

Besides, the fact that the fibrous microporous body receiving the water to be demineralized is less impregnated in advance, improves the quality of the demineralization.

The next complementary test highlights the role of the degree of impregnation of the fibrous microporous body. By using the same device as previously, the fibrous microporous body being constituted of lightened silica fibers, the variation of the water hardness level in two configurations was measured. The entry through-put of the water to be demineralized was approximately 35 cm³/minute and its water hardness level was 24.

In a first configuration, the fibrous microporous body was located above the demineralized water collected at the base of an enclosure, without it coming into contact with the water, in such a way that its impregnation was approximately 90%.

In a second configuration, the lower third of the fibrous microporous body was immersed in the demineralized water collected at the base of the enclosure, such that the fibrous microporous body was saturated with water (impregnation= 100%), such water rising in the fibrous microporous body under the effect of capillary forces.

TABLE V

| Location of the Lower Third of the Fibrous Microporous Body | Water Hardness Level of the Water Obtained |
|---|---|
| Immersed in demineralized water | 20 |
| Outside demineralized water | 16 |

The results illustrated in Table V clearly confirm the role played by the impregnation of the fibrous microporous body, and the improvement in demineralization, when such impregnation is relatively little.

Therefore, as is clear from the various tests described hereinabove, the device according to the invention is particularly simple and economical to implement because it does not require the use of any sophisticated gadgetry and the material required can be obtained simply by using common materials. In addition, it does not require any other expenditure of energy except the expenditure corresponding to the heating of the fibrous microporous body, because the percolation occurs under the effect of simple gravity. Finally, when water is previously heated for other reasons, for example in the case of a heater or a boiler, the device itself does not consume any additional energy, because the energy source used for heating the water can also be used to ensure heating of the fibrous microporous body.

The device according to the invention is, in addition, extremely reliable. Indeed, as noted previously, the efficiency of the device has a tendency to increase during functioning, and no maintenance is required. Limitation of use occurs, of course, due to the progressive clogging of the fibrous microporous body, although this device remains porous and permeable much longer than prior art devices. Simply replacing a fibrous microporous body covered with salt deposits by a new fibrous microporous body will enable the device to function anew. This is the only maintenance required by the devices according to the invention. It must be noted that this renewal will have substantially lower costs, as opposed to prior art devices.

Heating means of the fibrous microporous body can be of any type, as long as they enable the heating both of the surface and the volume of the fibrous microporous body without raising the temperature of the water to be demineralized, before such water enters into contact with the fibrous microporous body.

The heating of the fibrous microporous body can therefore be obtained for example, by passage of electrical current in the water contained in the fibrous microporous body. The electrical current is brought into the latter by electrodes applied on two of its opposing surfaces or inserted in its volume. One can also heat the fibrous microporous body by a magnetron emitting microwaves. Heating can also be obtained by one or several electrical resistances, that can, for example, be in the form of a resistive grid inserted in the fibrous microporous body. The latter can also be heated by placing it in an enclosure filled with steam. The latter is an especially interesting implementation of the invention because it enables a homogenous heating of a fibrous microporous body and it is very easy to obtain, especially when the device according to the invention equips a heating apparatus-and even more advantageously, a boiler. In the latter case, the fibrous microporous body can be placed in the steaming enclosure itself of the boiler, the water to be demineralized being, for example, stored at room temperature outside such enclosure and introduced into it by a distributor element.

In a special embodiment, the fibrous microporous body is crossed by a steam flow at counter-current from the direction of water percolation inside the fibrous microporous body, and this facilitates thermal exchanges inside the latter.

In the device according to the invention, the nature of the fibrous microporous body can be of practically any type.

The fibrous microporous body can therefore be made of a natural or synthetic material, which is a good or bad heat conductor. It can be made, for example, of intertwined fibers, of alum silicate of 2.5 micrometers in diameter or of silica of 5 or 9 micrometers in diameter, the porosity being approximately 75 to 98%.

Although it is possible to use any fibrous microporous body, it is, however, preferable to use fibrous microporous bodies that have a wide chemical association capability with calcium and magnesium salts, as for example, materials based on alum silicate or calcium silicate already cited hereinabove.

The thickness of the fibrous microporous body will preferably be smaller in comparison with its other dimensions. However, this thickness cannot easily be less than approximately 5 millimeters because, other than the resultant mechanical weaknesses, the transit time of water in the superficial layer of the fibrous microporous body, and then in its volume, can thereby be reduced substantially, and lead to a retention, and especially a precipitation, which is incomplete. However, in such a case, this situation is transient because, due to the creation of the microporous deposits at the surface of the fibrous microporous body, the resultant thickness increases with and transit time of water also increases substantially.

In the device according to the invention, the mechanism used to bring the water to be demineralized on the fibrous microporous body can be of any type, although systems enabling a good distribution of water are clearly preferable. The water can thus be brought, for example, tangentially with respect to the fibrous microporous body, its impregnation in the latter occurring progressively. Preferably, She water can be brought by irrigation, by for example of a ramp, or a diffusor or even a "sprayer." The water can be brought laterally on one of the vertical surfaces of the porous body, the percolation taking place due to the effect of the difference in height of the water on either side of the porous body. The water can be brought in a continuous flow, or alternatively, in a periodic flow, the latter implementation capable of possibly avoiding a much too sharp fall in temperature of the fibrous microporous body under the effect of the water to be demineralized arriving at its surface.

The device according to the invention can especially be placed upstream from the various devices supplied by tap water and that are sensitive to tartaring, and more generally, to the accumulation of mineral salts. Among such appliances, one can cite for example, industrial boilers, heaters, irons, and chemical reactors using tap water. The device according to the invention can also be used to desalinate salt water, for example, in combination with other methods.

Figure 2:
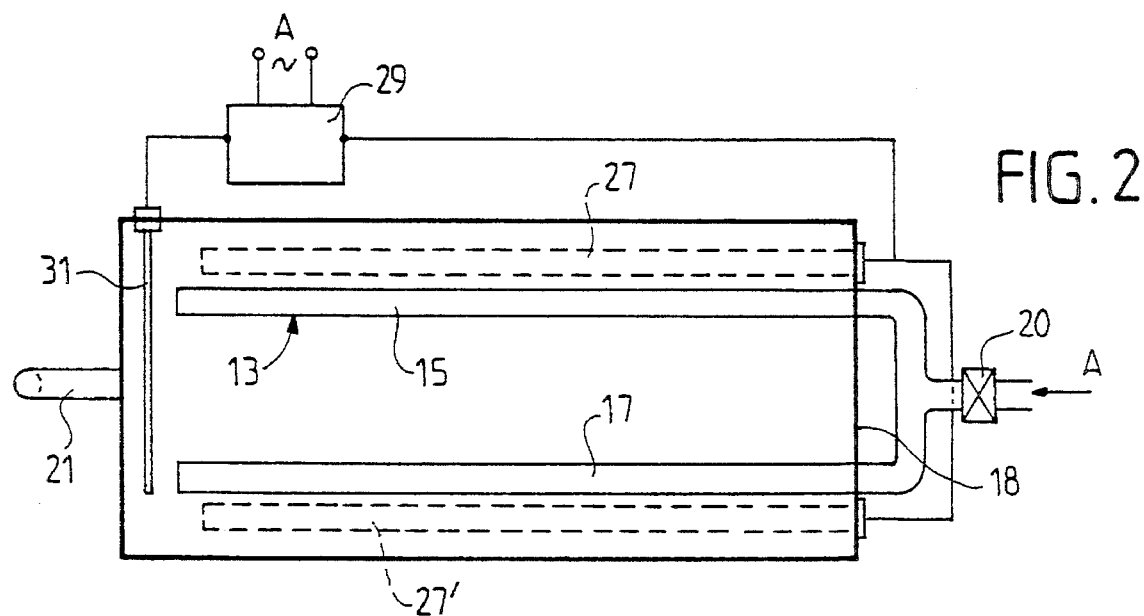
FIG. 2 is a top view of the demineralizing device represented in FIG. 1, the upper wall of such device having been removed.

In FIGS. 1 and 2, the demineralizing device is essentially constituted of a sealed enclosure 1 having a parallelopiped like shape, of a plastic material, such as polypropylene, inside which is located, substantially at mid-height, a fibrous microporous body block 3, whose height h is approximately 2 cm, which represents approximately a third of the height of enclosure 1. The fibrous microporous body 3 therefore divides enclosure 1 into two chambers, that is, an upper chamber 1a and a lower chamber 1b. The fibrous microporous body is inserted between two grids, an upper grid 9 and a lower grid 11, which are fixed, for example, by welding, to the vertical walls of enclosure 1. The fibrous microporous body 3 is constituted, in the present example, of a "mattress" of alum silicate fibers having a diameter of approximately 2.5 micrometers, as is commercialized under the trademark "DURABOARD" but, of course, other fibrous microporous bodies can also be used in the same configuration. A supply ramp for the water to be demineralized 13 is located above the upstream surface S of the fibrous microporous body 3. This ramp 13 is constituted of two tubes 15, 17, for example, made of polypropylene, which are parallel with respect to each other and to the upper surface S of the fibrous microporous body 3. Tubes 15, 17 cross one of vertical walls 18 of enclosure 1, on which they are fixed, and are joined outside enclosure 1, to the supply means of the water to be demineralized, not represented in the drawing, by means of a control electrovalve 20 which controls the supply of the water to be demineralized. Tubes 15, 17 are bored, in their lower portion., by a series of openings 19 located in a zig-zag, and adapted to ensure a regular and homogenous distribution of the water to be demineralized along the upstream surface S of fibrous microporous body 3. Naturally, the water to be demineralized can also originate from a supply which is not under pressure and in this case, the supply and adjustment of the through-put of the water to be demineralized will be obtained, for example, by means of an adjustable yield pump. An evacuation pipe 21 for the demineralized water is attached to lower chamber 1b of enclosure 1.

In the present embodiment of the invention, the heating means of the fibrous microporous body 3 are constituted of two resistances 27, 27' which are immersed in the fibrous microporous body 3, and which cross the vertical wall 18 of enclosure 1 on which they are fixed. These resistances are supplied with an electrical current by means of a regulation casing 29, itself supplied with electric current by sector A. A temperature sensor, constituted for example of a thermocouple 31, is housed at mid-thickness of the central surface of the fibrous microporous body 3. Thermocouple 31 is connected to the regulation casing 29, from which it receives its power and to which it sends the necessary information to efficiently regulate heating resistances 27 and 27'. Thus, when the temperature read by thermocouple 31 is less than the set point temperature T to which one wishes to bring fibrous microporous body 3, resistances 27, 27' are tensioned, which ensures a heating of the fibrous microporous body 3, and especially, of its upper surface. Thus, the regulation system constituted of thermocouple 31, regulation casing 29, and heating resistances 27, 27' ensures a maintenance of fibrous microporous body 3 at a temperature which is substantially constant and equal to the set point temperature T, the latter being above 60° C.

In these conditions, the demineralizing device according to the invention functions as is described hereinafter. Initially, a sufficient quantity of water to be demineralized is admitted along the upstream surface S of the fibrous microporous body 3, such that the water crosses the body by percolation, and starts to flow into the lower chamber 1b of enclosure 1. The regulation casing 29 is then energized and ensures the progressive heating of the fibrous microporous body 3 until it reaches the selected set point temperature T. When this temperature is reached, and since the fibrous microporous body 3 is already impregnated with water, any additional supply of water in it is immediately followed by an output of demineralized water, which flows into the lower chamber 1b of enclosure 1.

Naturally, the embodiment described hereinabove is a nonlimiting example of the many possible embodiments of the invention. Of course, variations can be provided that have the object of especially improving the performance of the device.

Thus, percolation, instead of being done at atmospheric pressure as in the preceding example, can also be done under pressure, for example, in the same way as the so-called "espresso" coffee makers, provided, that the upstream pressure is greater than the downstream pressure.

On the other hand, the device according to the invention can also be used in association with other devices. It can be implemented either upstream or downstream from such devices, so as to complete, as required, the demineralization obtained by such devices.

One can also make use of other heating devices other than electrical resistances to ensure heating of fibrous microporous body 3. One can thus, when the demineralizing device according to the invention is used in conjunction with an apparatus producing calorific energy, such as for example, a water heater or a boiler, use the heat produced by this apparatus to ensure the heating of the fibrous microporous body. One can also especially use a steam flow crossing such fibrous microporous body, for example, at a counter-current from the direction of percolation of water inside such body.

Figure 3:
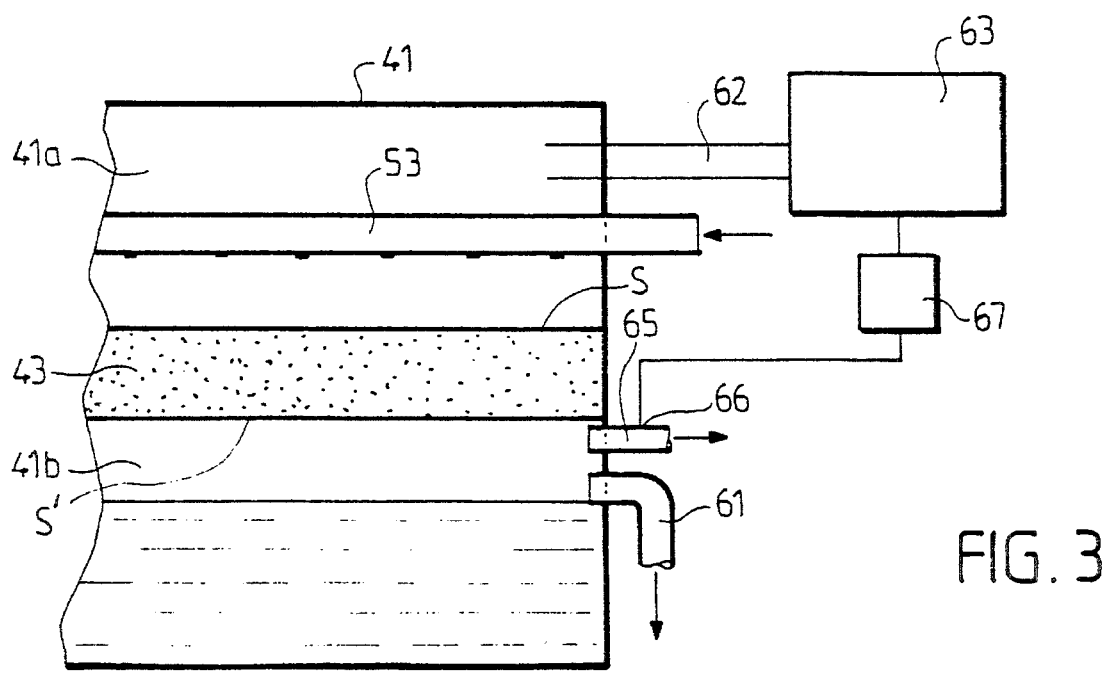
FIG. 3 is a partial and schematic vertical sectional view of a variation of a demineralizing device according to the invention.

In an embodiment of the invention, represented in FIG. 3, the heating of the fibrous microporous body is therefore ensured by steam. This device is constituted by a parallelopiped shaped enclosure 41, inside which is located, substantially at mid-height, a fibrous microporous body 43, which separates the inside of enclosure 41 into two chambers that is, an upper chamber 41a and a lower chamber 41b. The upper chamber 41a comprises, as previously, a ramp 53 adapted to ensure the supply of the upstream surface S of the fibrous microporous body 43 by the water to be demineralized, and the lower chamber 41b comprises a tube 61 adapted to evacuate the demineralized water produced by the device.

The upper chamber 41a is connected, by a tube 62, to a steam generator 63, and the lower chamber 41b is placed in contact with the atmosphere by a tube 65 for evacuation of residual steam. This tube 65 can be provided with a sensor 66 adapted to act, by means of an interface 67, on steam generator 63 so as to regulate the through-put of steam flow produced by such generator to a strict minimum, in order that upper chamber 41a is constantly filled with steam. Thus, a portion of the steam condenses on fibrous microporous body 43 and thus ensures its heating.

The device described in this manner functions as follows. Initially, the steam generator 63 is activated until it has provided adequate amounts of steam to fill chamber 41a. One can then supply the fibrous microporous body 43 with water, either continuously, or periodically, with the water to be demineralized, This water falls by simple gravity on the fibrous microporous body 43, at the upstream surface S from which a first salt precipitation occurs, and then it percolates, by simple gravity therein to finally fall into lower chamber 41b and be collected there by evacuation tube 61.

It is also possible to let steam generator 63 send the steam towards the enclosure in a continuous manner, and this avoids the use of steam yield regulation means. The steam generator 63 can also only be activated each time water is admitted, as long as such a functioning indeed ensures adequate temperature of the fibrous microporous body, i.e., a temperature greater than 60° C.

In a special embodiment, steam can be admitted beneath the fibrous microporous body 43 whereas evacuation of steam occurs above it. The steam thus crosses the fibrous microporous body 43 in a base-up direction, that is against the direction of water percolation. This results in an even easier heat transfer between the fibrous microporous body and the steam and an excellent homogeneity of heat distribution in the fibrous microporous body 43, which in turn improves salt retention within such body.

In an especially interesting embodiment, the fibrous microporous body is located at an incline beneath the ramp. Indeed, in such a case, the water arriving along the surface of the fibrous microporous body has a tendency to flow along such body, while impregnating it. The result is that the impregnation surface is greater than when the fibrous microporous body is horizontal.

Figure 4:
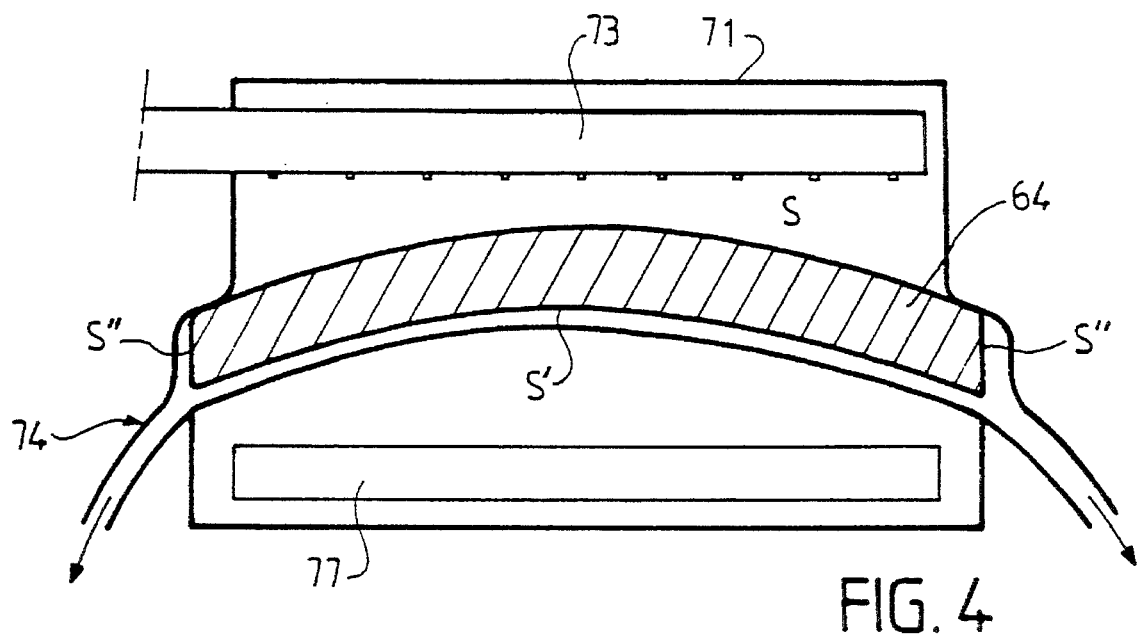
FIG. 4 is a schematic view in a vertical section of a variation of the embodiment of the invention.

Thus, in FIG. 4, the demineralizing device according to the invention is constituted by an enclosure 71 inside which is located a permeable fibrous microporous body 64 whose upper upstream surface S is supplied with the water to be demineralized by irrigation means 73. The fibrous microporous body 64 has an concave shape and its concavity is oriented downwardly, such that the water brought by irrigation means 73 can flow along its upper surface S. In this embodiment of the invention, collecting means 74 are provided to collect water leaving the lower surface or downstream surface S' of fibrous microporous body 64 as well as the water leaving the lateral surfaces S" thereof.

Heating device 77 are located beneath the fibrous microporous body 64. These heating devices 77 can be of any type and can, in an interesting manner, be constituted by heating devices specific to apparatuses used in conjunction with the device according to the invention, such as heaters or boilers.

Figure 5:
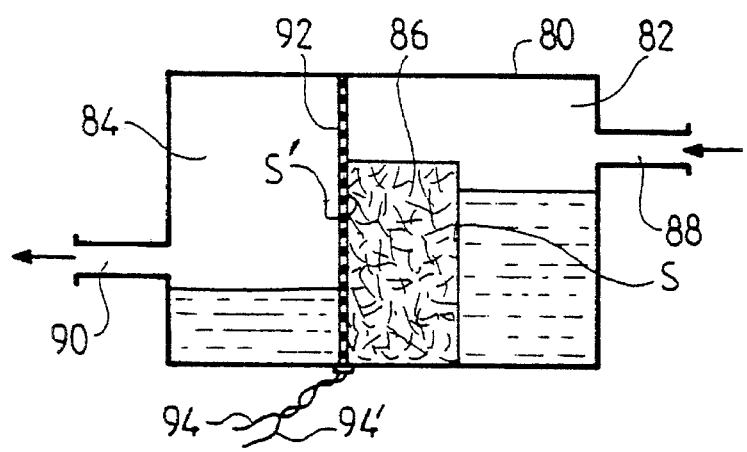
FIG. 5 is a schematic perspective view of a variation of the embodiment of the device according to the invention.

In a particularly simple and inexpensive embodiment of the demineralizing device according to the invention, represented in FIG. 5, water percolation occurs in a horizontal direction. The device is constituted by an enclosure 80, having a substantially parallelopiped like shape, which is divided by a resistive grid 92 fixed on the walls of enclosure 80, into two internal chambers, in other words an upstream chamber 82 and a downstream chamber 84. The upstream chamber 82 comprises a supply pipe 88 for the water to be demineralized and the downstream chamber 84 comprises an evacuation pipe 90 for the demineralized water, whose height with respect to the base of enclosure 80 determines the volume of demineralized water contained in the apparatus. A fibrous microporous body 86 constituted of a block of lightened silica, constituted of silica fibers of a diameter of approximately 9 micrometers is applied by one of its main surfaces against the upstream surface of the resistive grid 92, and is fixed by its lower surface and its transverse surfaces on the walls of enclosure 80, such that the water admitted into the upstream chamber 82 can only flow into the downstream chamber 84 by crossing the fibrous microporous body 86.

The resistive grid 92 is supplied with electrical current by two wires 94, 94', so as to bring the fibrous microporous body to the temperature required, greater than 60° C. and preferably approximately 80° C. Preferably the fibrous microporous body 86 will occupy the greater portion of the height of enclosure 80. The water to be demineralized is admitted by groove 88 into upstream chamber 82, from which it crosses the fibrous microporous body 86 to flow, through resistive grid 92, into downstream chamber 84. When the level of the demineralized water in this chamber reaches that of output groove 90, the demineralized water flows via the latter. Naturally, the resistive grill 92 can also be located inside the porous body.

As mentioned previously, such an embodiment is interesting because of the simplicity with which it enables one to obtain an efficient demineralization of water. It must be noted however that in view of the importance of wetting the fibrous microporous body 86, the quality of the demineralization provided is not optimal.

This application is related to French Patent Application No. 92.02107, filed Feb. 24, 1992, whose priority is claimed, the disclosure of which is incorporated by reference in its entirety.

What is claimed is:

1. Apparatus for demineralizing water comprising:
    porous material for demineralizing water comprising a fibrous microporous body including interfiber spaces in communication with one another, an upstream surface, a downstream surface, and a porosity of at least 50%;
    supply means for supplying water to be demineralized to said upstream surface of said fibrous microporous body to cause percolation of the water through said fibrous microporous body from said upstream surface toward said downstream surface;
    heating means for heating said fibrous microporous body, at least during percolation of the water, to a temperature of at least 60° C. so as to rapidly increase the temperature of the water to be demineralized that comes into contact with said fibrous microporous body; and
    means for collecting demineralized water after percolation through said fibrous microporous body.

2. The apparatus as defined by claim 1, wherein said fibrous microporous body comprises opposing side surfaces and said upstream surface is separated from said downstream surface by a distance less than a distance between said opposing side surfaces.

3. The apparatus as defined by claim 1, wherein said heating means comprise at least one electrical resistance in contact with said fibrous microporous body.

4. The apparatus as defined by claim 3, wherein said heating means comprise a resistive grid in contact with said fibrous microporous body.

5. The apparatus as defined by claim 4, wherein said resistive grid is located inside said fibrous microporous body.

6. The apparatus as defined by claim 1, wherein said upstream surface and said downstream surface comprise opposing surfaces, and said heating means comprise two conducting electrodes supplied with electrical current in contact with said opposing surfaces of said fibrous microporous body.

7. The apparatus as defined by claim 6, wherein said two conducting electrodes are located inside said fibrous microporous body.

8. The apparatus as defined by claim 1, wherein said heating means comprise a steam generator.

9. The apparatus as defined by claim 8, wherein said steam generator is adapted to create a steam flow in which said fibrous microporous body is totally immersed.

10. The apparatus as defined by claim 8, wherein said steam generator comprises means for injecting steam through said fibrous microporous body countercurrent to direction of percolation of water inside said fibrous microporous body.

11. The apparatus as defined by claim 1, wherein said heating means comprise a microwave generator.

12. The apparatus as defined by claim 11, wherein said microwave generator comprises a magnetron.

13. The apparatus as defined by claim 1, wherein said upstream surface of said fibrous microporous body is inclined with respect to a horizontal axis, and is located beneath said supply means.

14. The apparatus as defined by claim 1, wherein said upstream surface of said fibrous microporous body comprises a lateral vertical surface.

15. The apparatus as defined by claim 1, wherein said fibrous microporous body is made from a member selected from the group consisting of calcium silicate, alum silicate, silica, mineral wool, and mixtures thereof.

16. The apparatus as defined by claim 1, wherein said heating means is adapted to bring the temperature of said fibrous microporous body to a temperature at least 60° C. greater than that of the water to be demineralized.

17. The apparatus as defined by claim 1, wherein said fibrous microporous body is concave in a direction of said downstream surface.

18. A method for demineralizing water comprising:
    heating a fibrous microporous body to about 60° C., the fibrous microporous body comprising interfiber spaces in communication with one another, an upstream surface, a downstream surface, and a porosity of at least 50%;
    supplying a sufficient quantity of water to be demineralized to said upstream surface, percolating the water through the fibrous microporous body and through the downstream surface; and
    collecting demineralized water.

19. The method as defined by claim 18, wherein said water is supplied continuously.

20. The method as defined by claim 18, wherein said water is supplied periodically.

21. The method as defined by claim 18, wherein said water is percolated under pressure.

22. The method as defined by claim 18, wherein said fibrous microporous body is heated by steam.

23. The method as defined by claim 22, wherein said fibrous microporous body is heated by a steam flow in which the fibrous microporous body is totally immersed.

24. The method as defined by claim 22, wherein the fibrous microporous body is heated by steam injection through the fibrous microporous body at countercurrent with respect to direction of percolation of water through the fibrous microporous body.

25. The method as defined by claim 18, wherein said water is heated by at least one electrical resistance in contact with the fibrous microporous body.

26. The method as defined by claim 25, wherein said water is heated by a resistive grid in contact with the fibrous microporous body.

* * * * *